United States Patent
Yoon

(10) Patent No.: US 10,147,911 B2
(45) Date of Patent: Dec. 4, 2018

(54) LITHIUM ION PRISMATIC CELL COMPRISING MULTIPLE JELLY ROLLS WITH ADDITIONAL MATERIAL BETWEEN JELLY ROLLS

(71) Applicant: A123 Systems, LLC, Waltham, MA (US)

(72) Inventor: Sang Young Yoon, Bedford, MA (US)

(73) Assignee: A 123 Systems, LLC, Waltham, MA (US)

( * ) Notice: Subject to any disclaimer, the term of this patent is extended or adjusted under 35 U.S.C. 154(b) by 458 days.

(21) Appl. No.: 14/390,710

(22) PCT Filed: Apr. 4, 2013

(86) PCT No.: PCT/US2013/035202
§ 371 (c)(1),
(2) Date: Oct. 3, 2014

(87) PCT Pub. No.: WO2013/152149
PCT Pub. Date: Oct. 10, 2013

(65) Prior Publication Data
US 2015/0093617 A1  Apr. 2, 2015

Related U.S. Application Data

(60) Provisional application No. 61/620,736, filed on Apr. 5, 2012.

(51) Int. Cl.
*H01M 2/02* (2006.01)
*H01M 10/0525* (2010.01)
(Continued)

(52) U.S. Cl.
CPC ............ *H01M 2/021* (2013.01); *H01M 4/13* (2013.01); *H01M 10/0431* (2013.01);
(Continued)

(58) Field of Classification Search
None
See application file for complete search history.

(56) References Cited

U.S. PATENT DOCUMENTS

| | | |
|---|---|---|
| 6,165,638 A | 12/2000 | Spillman et al. |
| 2009/0154064 A1 | 6/2009 | Tasaki et al. |
| 2012/0021274 A1* | 1/2012 | Kim ...................... H01M 2/263 429/151 |

FOREIGN PATENT DOCUMENTS

| | | |
|---|---|---|
| CN | 101138058 A | 3/2008 |
| CN | 102347467 A | 2/2012 |

(Continued)

OTHER PUBLICATIONS

JP2003-297303—English translation (Year: 2003).*
(Continued)

*Primary Examiner* — Sarah A. Slifka
*Assistant Examiner* — Haroon S. Sheikh
(74) *Attorney, Agent, or Firm* — McCoy Russell LLP

(57) ABSTRACT

Techniques disclosed herein include systems and methods that improve the speed of jelly roll assembly for large format and high capacity cells as compared to a stack-folding production method. In one embodiment, a higher speed winding process is achieved, and, in addition, a higher capacity and energy can be achieved by adding at least one (additional) cathode layer between the jelly roll. Such an addition minimizes the loss of use of an anode outer layer.

3 Claims, 8 Drawing Sheets

(51) Int. Cl.
  *H01M 10/0583* (2010.01)
  *H01M 4/13* (2010.01)
  *H01M 10/04* (2006.01)
  *H01M 10/6555* (2014.01)

(52) U.S. Cl.
  CPC ... *H01M 10/0436* (2013.01); *H01M 10/0525* (2013.01); *H01M 10/0583* (2013.01); *H01M 10/6555* (2015.04); *H01M 2/0212* (2013.01); *H01M 2200/00* (2013.01)

(56) References Cited

FOREIGN PATENT DOCUMENTS

| | | |
|---|---|---|
| JP | H10270069 A | 10/1998 |
| JP | H10284132 A | 10/1998 |
| JP | 2003297303 A | 10/2003 |
| JP | 2005056655 A | 3/2005 |
| JP | 2006277990 A | 10/2006 |
| JP | 2012028315 A | 2/2012 |
| KR | 20080074239 A | 8/2008 |

OTHER PUBLICATIONS

Korean Intellectual Property Office, International Search Report of PCT/US2013/035202, dated Jul. 5, 2013, WIPO, 2 pages.
Japan Patent Office, Office Action Issued in Application No. 2015-504712, dated Mar. 14, 2017, 10 pages.
State Intellectual Property Office of the People's Republic of China, Second Office Action Issued in Application No. 2013800295321, dated Apr. 26, 2017, 10 pages. (Submitted with Partial Translation).

\* cited by examiner

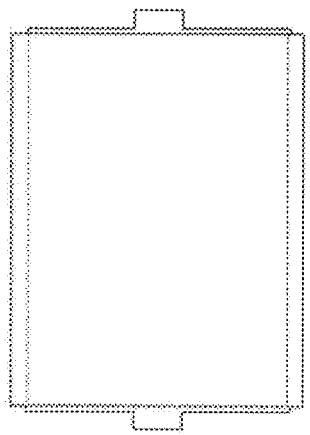
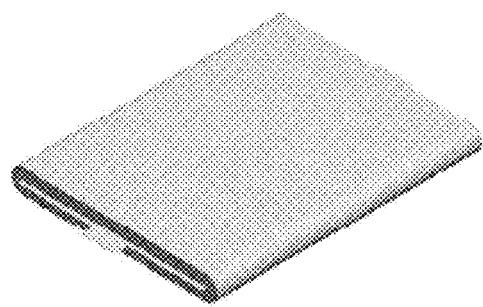
*FIG. 1*
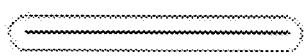
PRIOR ART

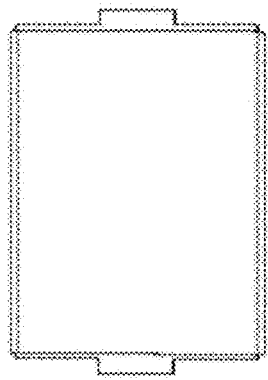
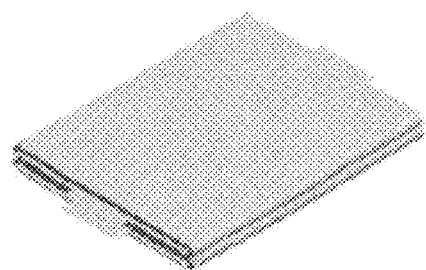
*FIG. 2*
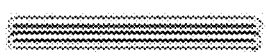
PRIOR ART

LITHIUM ION PRISMATIC CELL COMPRISING MULTIPLE JELLY ROLLS WITH ADDITIONAL MATERIAL BETWEEN JELLY ROLLS

CROSS REFERENCE TO RELATED APPLICATIONS

This application is a United States National Phase of International Patent Application No. PCT/US2013/035202, entitled "The Lithium Ion Prismatic Cell Comprising Multiple Jelly Rolls With Additional Material Between Jelly Rolls," filed Apr. 4, 2013, which claims priority to U.S. Provisional Patent Application No. 61/620,736, entitled "The Lithium Ion Prismatic Cell Comprising Multiple Jelly Rolls With Additional Material Between Jelly Rolls," filed Apr. 5, 2012, the entire contents of each of which are hereby incorporated by reference in their entirety for all purposes.

BACKGROUND

The present disclosure relates to batteries and particularly to rechargeable batteries, including batteries for use in automotive power train systems.

One conventional battery design includes layering anode material, separator material, and cathode material. Multiple layers of these materials can then be rolled up and inserted in a cylinder, or rolled up and then flattened before being inserted in a corresponding housing. Such rechargeable batteries are known as jelly roll batteries or rechargeable batteries having a jelly roll or somewhat spiraling cross section. In some batteries, one or multiple jelly rolls are inserted into a can or container.

SUMMARY

There has been a loss of capacity because of dead space in conventional prismatic battery cells because of a non-useable outer layer of anode material. Additionally, high temperature storage performance of such conventional cells deteriorates due to trapped lithium in the non-usable and additional outer anode layers in the cells.

Techniques disclosed herein include systems and methods that improve the speed of jelly roll assembly for large format and high capacity cells as compared to a stack-folding production method. In one embodiment, a higher speed winding process is achieved, and, in addition, a higher capacity and energy can be achieved by adding at least one (additional) cathode layer between the jelly roll. Such an addition minimizes the loss of use of an anode outer layer.

Including an additional single-side coated cathode sheet between jelly rolls can increase the capacity of a battery. Multiple jelly rolls are often inserted into one pouch or container to minimize dead space between the edge of a jelly roll and prismatic can. The curvature of a jelly roll can be bigger when preparing a thicker jelly roll. Thus, preparing thinner jelly rolls and using multiple jelly rolls can increase capacity by minimizing the dead space at the corner. In this case, however, the outer anode layer can be used for the cell capacity by adding an additional cathode sheet. The additional cathode sheet can also increase storage performance at high temperatures by removing a previously non-usable anode layer. This non-usable anode layer can trap lithium into the layer, resulting in a loss of usable lithium for conventional prismatic cells.

In another embodiment, a metal plate is used as a mandrel or additional layer between two jelly rolls. Adding this metal plate improves battery performance by functioning as a cooling fin in the cell or pack, such as in cylindrical cells. Using an aluminum plate or other metal plate can be used as a cooling plate and/or external tab to make the cells within a two tab design a one-tab design. Accordingly, a higher volumetric energy density can be achieved by reducing the sealed and tabbed area on the other side. This solution effectively minimizes the loss of space for tabbing and sealing.

This technique obtains cells or battery packs with high volumetric energy due to the reduced additional sealed and tabbed area (space) by adding an additional metal plate (for example, an aluminum plate) or sheet between jelly rolls. Using multiple jelly rolls in a pouch or container can minimize dead space at the edge or end of a jelly roll. The curvature of a jelly roll can be bigger when preparing a thicker jelly roll. Thus, preparing thinner jelly rolls and using multiple jelly rolls can increase capacity. In this embodiment, each jelly roll can be finished by separators. A metal plate can be added between two jelly rolls for a dual function of current collecting and providing a cooling fin. An additional cooling pad might not be needed for a battery pack design when the metal plate is used. Additionally, such an embodiment provides better abuse tolerance by better controlling internal short circuits.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE FIGURES

FIG. 1 shows a conventional design of a jelly roll (wound flat wrap) having a terminal on each end of the jelly roll.

FIG. 2 shows a conventional design of two jelly rolls pressed together, with each jelly roll having a terminal on each end of the jelly roll.

DETAILED DESCRIPTION

Figure 3:
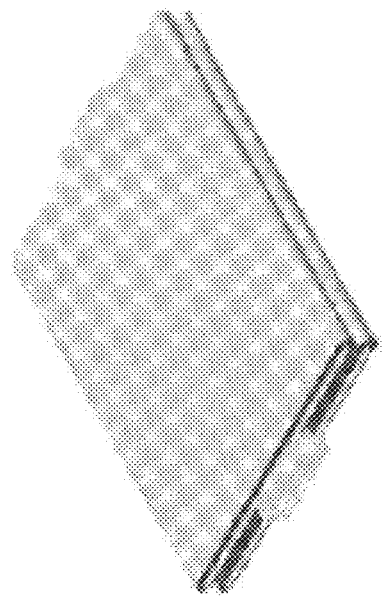
FIG. 3 shows a new embodiment that adds one cathode between two jelly rolls.
Figure 3:
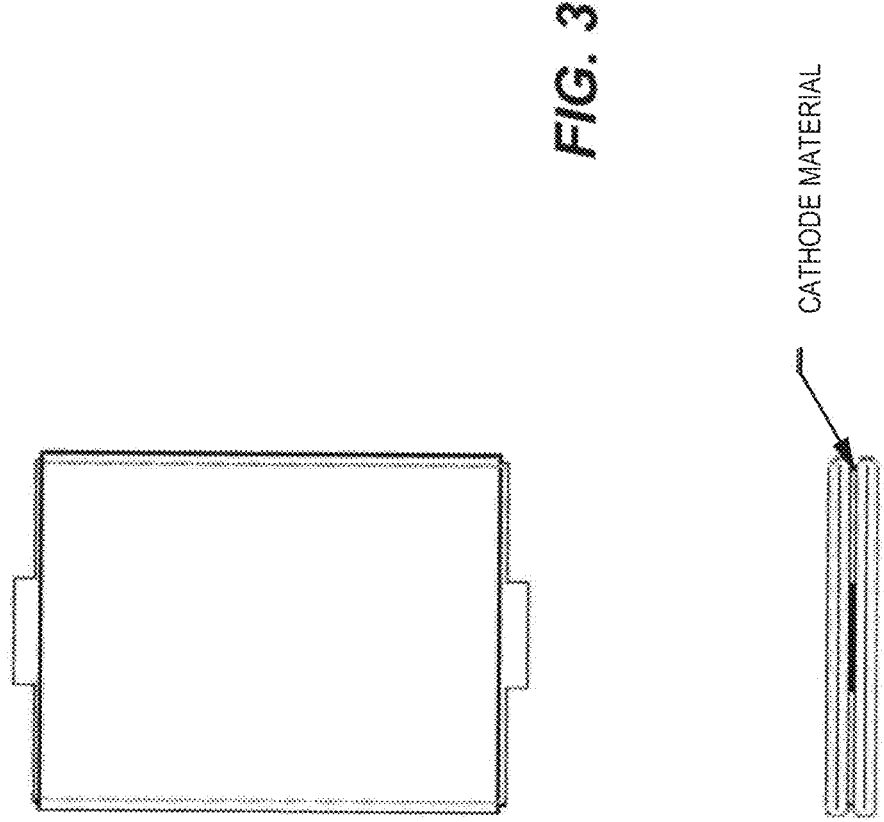

In one technique, an additional cathode material layer, that can be coated on both sides, can be positioned between the jelly rolls. An extension tab can then be welded to the extra bare foils on the edge of electrodes. After being sealed within the pouch, the electrolyte will be filled into a pouch case and will be activated.

In another embodiment, abuse tolerance can be obtained by adding an additional bare foil set with a high shrinkage separator on the jelly roll. This additional layer will get shorted when there is contact between bare foils, which can make the SOC (State of Charge) of cells lower. The lower SOC cells are less reactive than high SOC cells. Techniques disclosed herein provide high energy density, better storage performance, and lower cost of assembly production.

In one embodiment, an additional metal plate is added between the jelly rolls or between pairs of jelly rolls. An extension tab can be welded to extra bare foils and this plate, which can be connected to an external tab through the jelly rolls. In addition to this tab, another tab can be placed beside this tab by welding with foils. An insulating polymer pad can be used to insulate between metal plate and foils for the other tab. In one embodiment, an aluminum plate disposed between a pair of jelly rolls can be used as a positive tab. After being sealed within a pouch, an electrolyte can be filled into the pouch or case and can activate the sealed cell to the formation.

Other metal plates can be used for anode or cathode. Using an aluminum plate is beneficial as it can provide better safety, lower cost, and high specific energy. Advantages of this embodiment include high volumetric energy density, low-cost assembly production, and abuse tolerant cells. Also, using the metal plate for current collecting and cooling cells can reduce or eliminated a need for an additional cooling pad in a corresponding battery pack design.

Regarding battery cell design in general, efficient batteries are important for several applications, including hybrid electric vehicles (HEV). To address this, Lower-Energy Energy Storage System (LEESS) cell development was started. The cost of materials can be lowered by improving cell power (less stacks). The process costs can be lowered by using a winding assembly. A winding assembly conventionally results in a tab (electrical terminal) on each end of a flattened winding (Wound Flat Wrap or WFW). Ultra-thin electrodes in the winding can be beneficial. For example, this can lower a number of turns for a given winding, such a 4Ah/9.5 turns (as an optimum range for winding). Yet there is a difficulty in handling of thin electrodes by a pick-and-place stacker. In typically cell configurations, there is a side tab/electrode on each end of a battery cell. This can result in a 3% energy loss (energy density) because of the additional sealed area for the other side tab. One reason is that jelly roll layers can not fully extend to fill a battery cell space because of the tabs.

Figure 6:
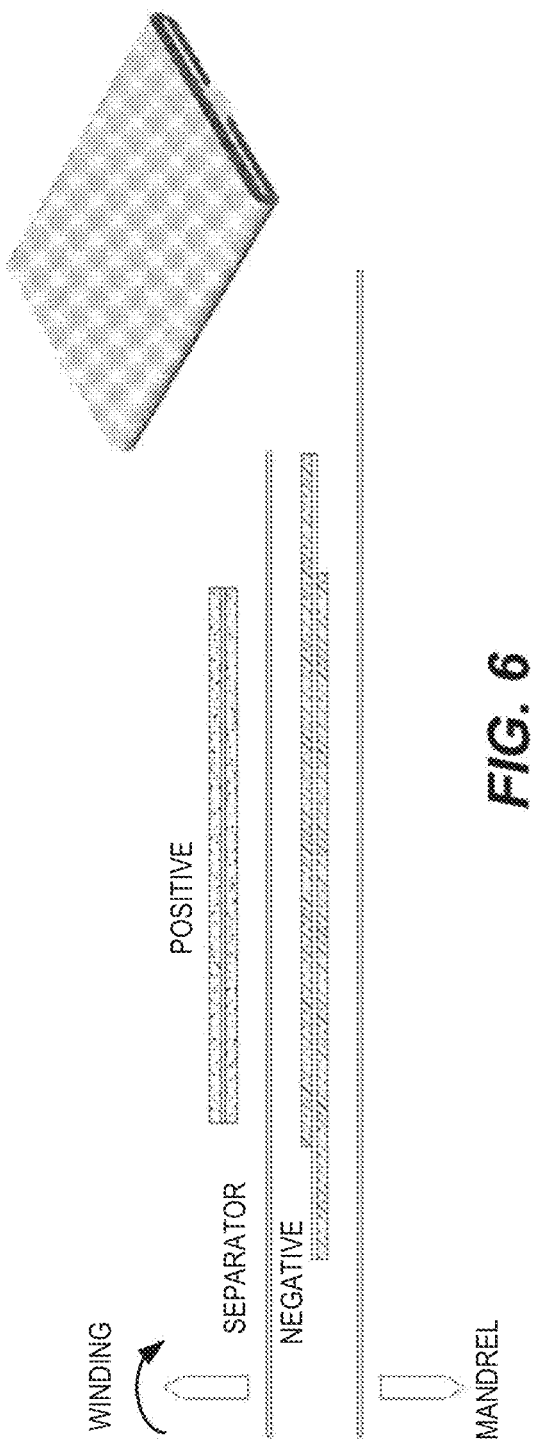
FIG. 6 illustrates the winding concept of jelly roll batteries.

FIG. 6 illustrates the winding concept of jelly roll batteries. Uncoated foil for the extension tab can be used after trimming. Half side coated anode is wound first, then this anode is wrapped at the outer jelly roll. After winding the positive, separator, and negative layers, the resulting cylindrical shape can be flattened (squashed). The flattened wound jelly roll can be inserted in a pouch, filled with an electrolyte, and then vacuum sealed. Extra foils can be trimmed after winding.

FIG. 1 shows a conventional design of a jelly roll (wound flat wrap) having a terminal on each end of the jelly roll.

FIG. 2 shows a conventional design of two jelly rolls pressed together, with each jelly roll having a terminal on each end of the jelly roll. This design can improve energy density over the design of FIG. 1.

FIG. 3 shows a new embodiment that adds one cathode between two jelly rolls. This addition increases energy density. In addition to adding the cathode layer, or in place of adding the cathode layer, a metal plate can be positioned in between the two jelly rolls. In either embodiment, tab arrangement can be modified to improve energy density as a result of adding the layer between the two jelly rolls, such as part of a prismatic cell design.

Figure 5:
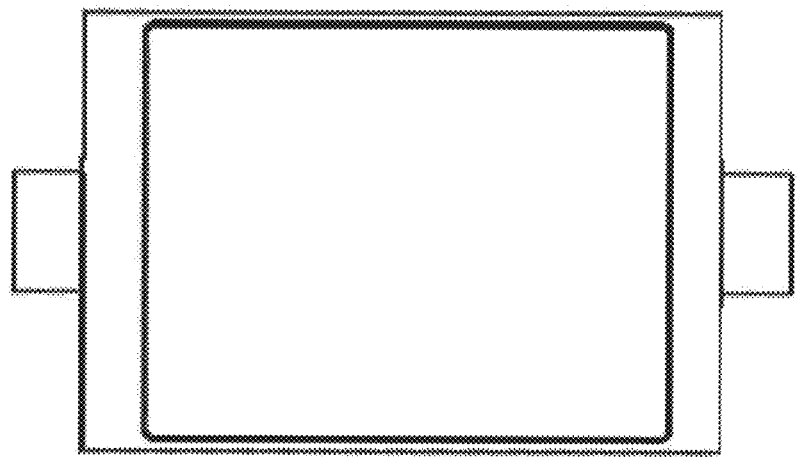
FIG. 5 shows an embodiment with a central layer added, enabling positioning two tabs on one side.
Figure 4:
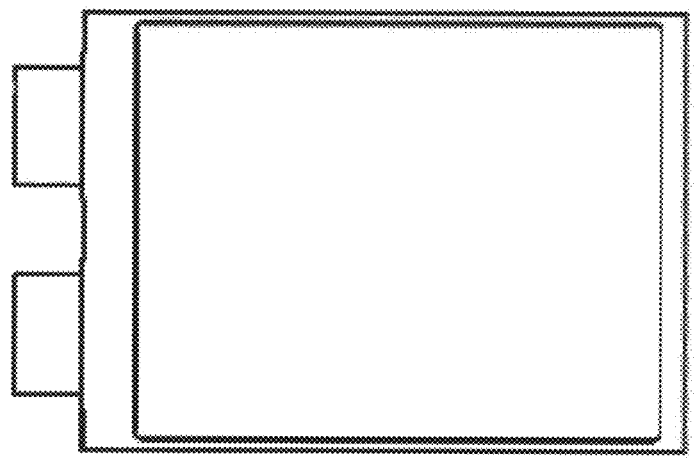
FIG. 4 shows an embodiment with electrical tabs or terminals on each side.

FIG. 4 shows an embodiment with electrical tabs or terminals on each side. In FIG. 5, with a central layer added, a conduit from one end to the other end is formed, enabling positioning two tabs on one side. Such a configuration allows for using either more jelly roll material in a given battery cell, or creating battery cells with a smaller footprint. In either configuration, there is an increase in energy density.

Figure 7:
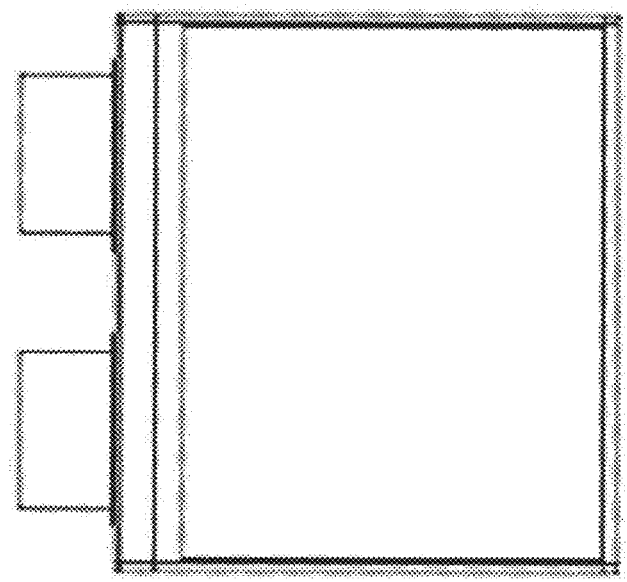
FIG. 7 shows cell design of an example battery.
Figure 7:
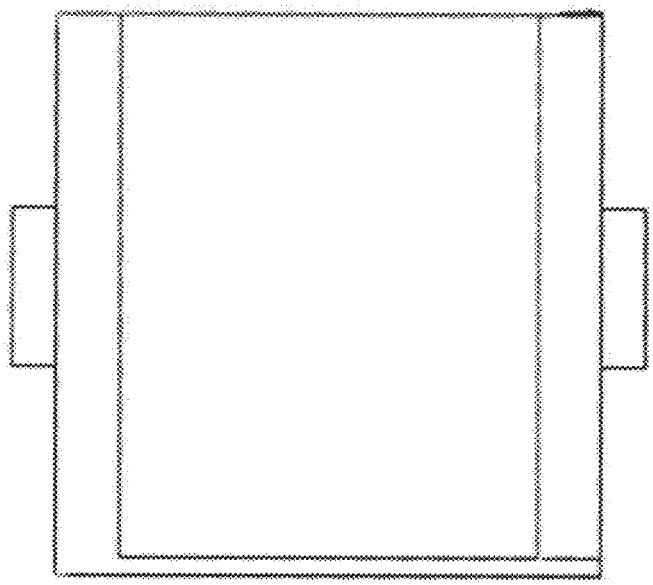

FIG. 7 shows cell design of an example battery.

Figure 8:
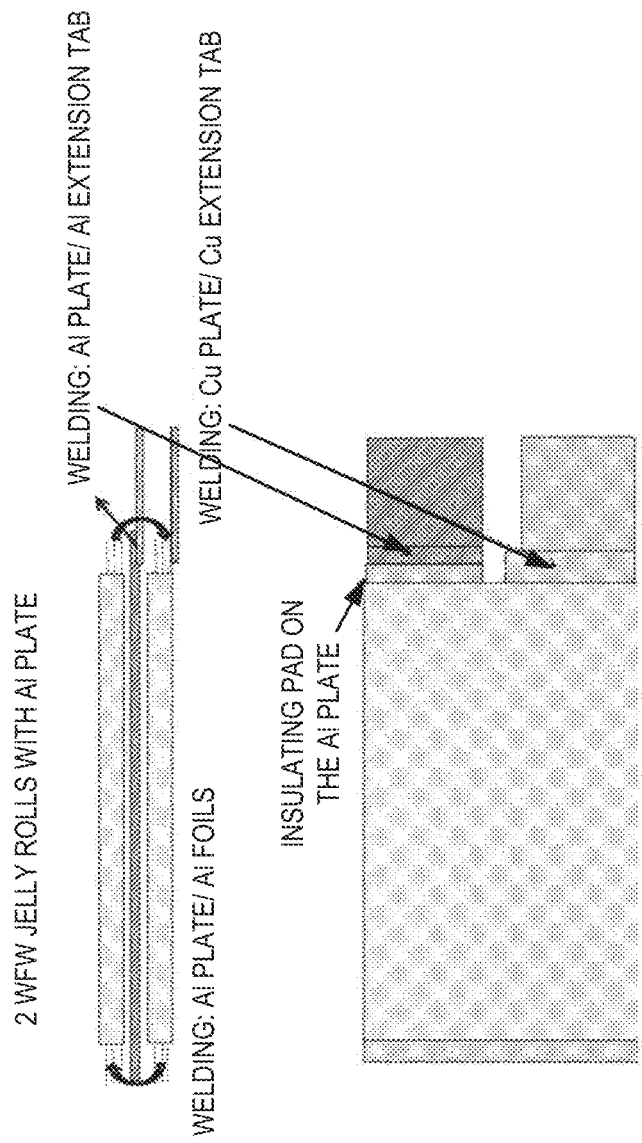
FIG. 8 shows an example embodiment of two wound flap wrap jelly rolls with an aluminum plate positioned between the two jelly rolls.

FIG. 8 shows an example embodiment of two wound flap wrap jelly rolls with an aluminum plate positioned between the two jelly rolls. FIG. 8 includes side and top views showing how the aluminum plate or foil can create an electrical path between the two jelly rolls so that the aluminum and copper tabs are both located on one side/end of the jelly roll pair.

Figure 9:
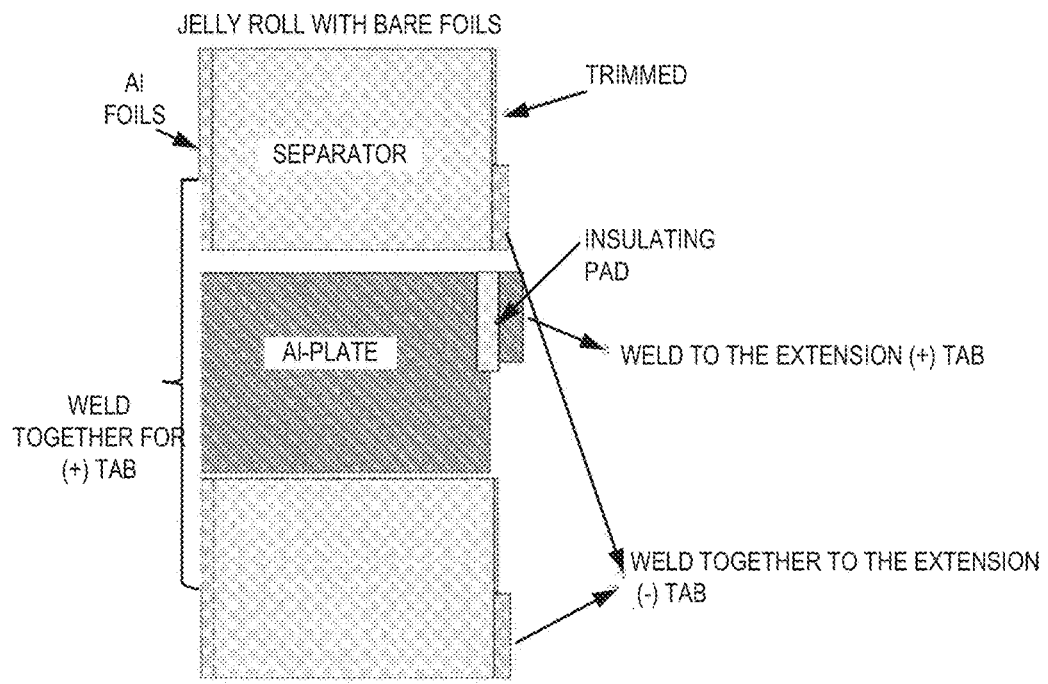
FIG. 9 is a side view of each component for the bi-jelly rolls with an aluminum (Al) plate.
Figure 10:
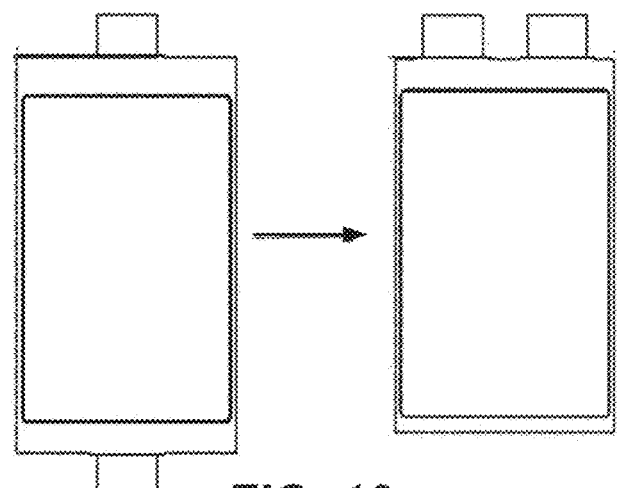
FIG. 10 shows a configuration of final seal cells.

FIG. 9 is a side view of each component for the bi-jelly rolls with an aluminum (Al) plate. FIG. 9 show how the layers can be trimmed and joined together. FIG. 10 shows a configuration of final seal cells and how the metal plate can increase energy density by improving geometry of the terminals by having the terminals on a same side of the bi-jelly roll.

Thus, embodiments include a new bi-jelly roll structure. Instead of having a copper tab on one end and an aluminum tab on the opposite end, an aluminum plate or a double side coated cathode sheet is run up through the middle of the jelly roll pair. Such a configuration can maximize use of outer anode layers. In one example, this can provide a parallel connection of jelly rolls by using one cathode between jelly rolls.

Those skilled in the art will also understand that there can be many variations made to the operations of the techniques explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:
1. A battery cell comprising:
  a first jelly roll, the first jelly roll being substantially flattened and including multiple layers of anode material, cathode material, and separator material that insulates between the anode material and cathode material;
  a second jelly roll, the second jelly roll being substantially flattened and including multiple layers of anode material, cathode material, and separator material that insulates between the anode material and cathode material;
  a layer of cathode material positioned between the first jelly roll and the second jelly roll;
  wherein the first jelly roll, the second jelly roll, and the layer of cathode material are positioned within the battery cell;

wherein the layer of cathode material positioned between the first jelly roll and the second jelly roll extends beyond the jelly rolls; and a first terminal and a second terminal both located on a same side of the battery cell;

wherein the layer of cathode material between the first jelly roll and the second jelly roll forms a conduit from one end of the battery cell to an opposite end of the battery cells;

wherein the layer of cathode material between the first jelly roll and the second jelly roll forms an electrical path between the first and second jelly rolls; and wherein the electrical path enables the first terminal and the second terminal to be on the same side of the battery cell.

2. A battery cell comprising:

a first jelly roll, the first jelly roll being substantially flattened and including multiple layers of anode material, cathode material, and separator material that insulates between the anode material and cathode material;

a second jelly roll, the second jelly roll being substantially flattened and including multiple layers of anode material, cathode material, and separator material that insulates between the anode material and cathode material;

a metal plate positioned between the first jelly roll and the second jelly roll such that the first jelly roll and the second jelly roll are in contact with the metal plate;

wherein the first jelly roll, the second jelly roll, and the metal plate are positioned within the battery cell; and a first terminal and a second terminal both located on a same end of the battery cell;

wherein the metal plate creates an electrical path between the first and the second jelly rolls; and wherein the electrical path enables the first terminal and the second terminal to be on the same end of the battery cell;

wherein the metal plate extends beyond the jelly rolls; and wherein the metal plate is aluminum.

3. The battery cell of claim 2, wherein the metal plate includes cathode material.

* * * * *